Figure 7:
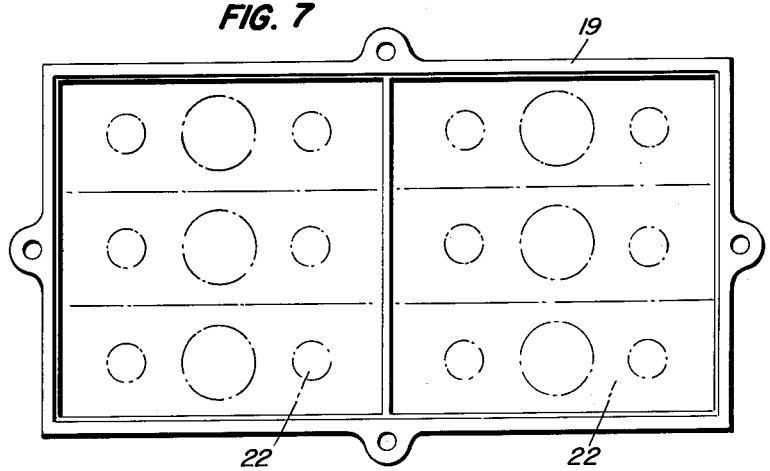

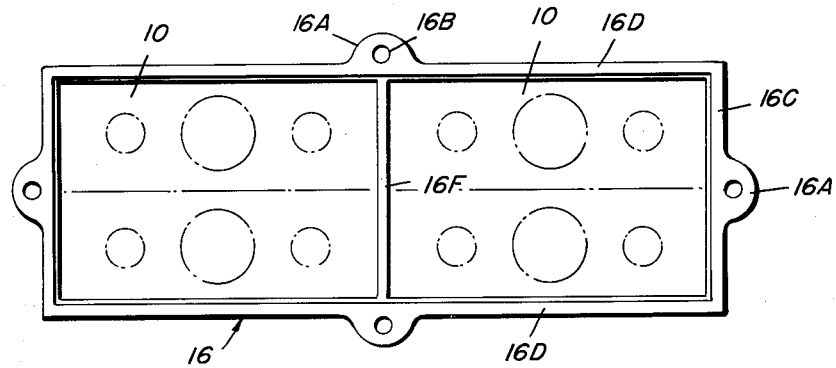
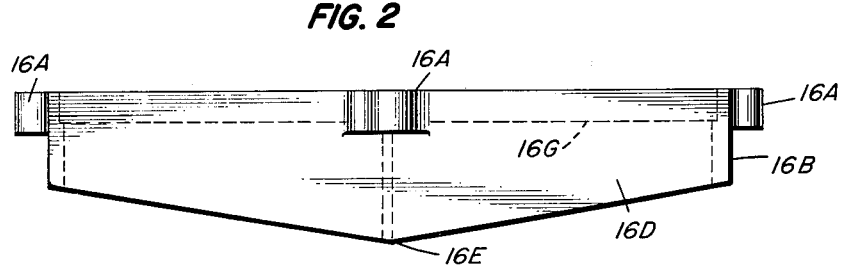
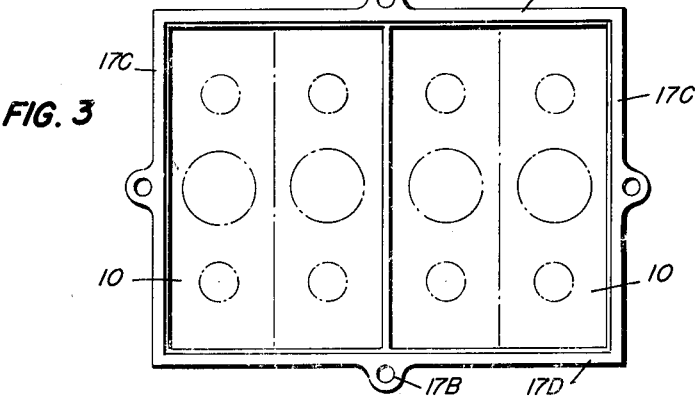
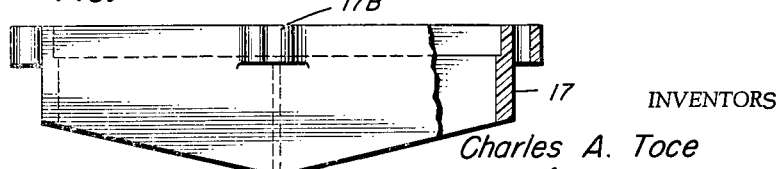
INVENTORS
Charles A. Toce
Robert Broussard
BY
THEIR ATTORNEY

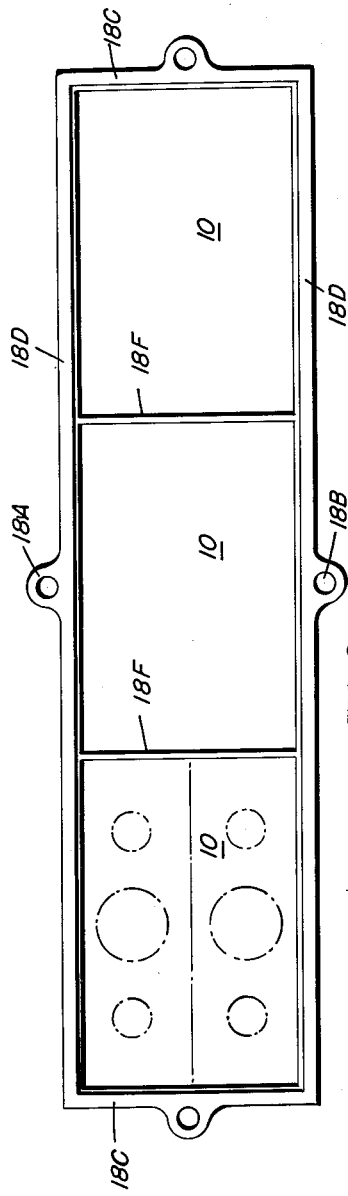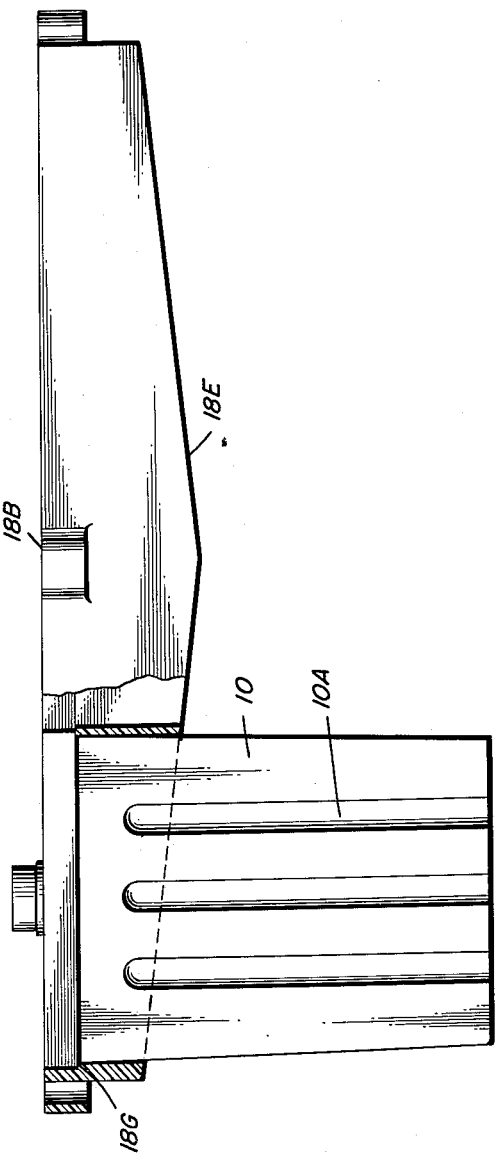

April 18, 1961 C. A. TOCE ET AL 2,980,752
ELECTRIC STORAGE BATTERY
Filed May 23, 1958 4 Sheets-Sheet 3

INVENTORS
Charles A. Toce
Robert Broussard
BY
THEIR ATTORNEY

April 18, 1961 C. A. TOCE ET AL 2,980,752
ELECTRIC STORAGE BATTERY
Filed May 23, 1958 4 Sheets-Sheet 4

INVENTORS
Charles A. Toce
Robert Broussard
BY
THEIR ATTORNEY

United States Patent Office 2,980,752
Patented Apr. 18, 1961

2,980,752
ELECTRIC STORAGE BATTERY
Charles A. Toce, Sunland, and Robert Broussard, Glendale, Calif., assignors to Electro-Acid Corporation of Nevada, a corporation of Nevada Filed May 23, 1958, Ser. No. 737,413
5 Claims. (Cl. 136—166)

Our invention, relating broadly to electric storage batteries, more particularly concerns the production of electric storage battery assemblies which, while varying widely from each other both as to electrical ratings and physical sizes and configurations, are all readily and directly produced from a limited number of standardized components.

One object of our invention is to produce a storage battery assembly which has particular appeal to the small manufacturer and wherein the some eight or more recognized types of batteries are produced from a combination of separable battery cases and mounting frames, it being necessary to produce and stockpile only a small number of standardized cases and frames in order to permit direct and ready assembly of any of the comparatively large number of different types of batteries having present-day acceptance on the market.

Another object is the provision of a storage battery assembly, the component elements of which can be readily produced by known and available techniques and equipment and at small cost, and thereafter readily stockpiled either at the factory or at regional warehouses, the battery cases conveniently being telescoped within each other, as may be those of the comparatively small number of different sizes of mounting frames which are of the same size, the resultant battery, in assembly, being itself characterized by inherent light weight, its high dielectric value, its freedom from detrimental heating during operation together with the basic simplicity of its production, requiring but small capital investment, minimum labor demand, and close adherence to known production techniques.

A further object is to provide a built up battery responding to any selected one of a number of different conventional sizes and ratings, which assembled battery can be readily provided as required from a minimum variety of piled and stacked component parts, which composite battery, once produced, displays rugged operating characteristics, basic simplicity and reliability in service, and rapid elimination of heat.

Yet another object is to produce a battery cap characterized by its ready manufacture at low cost, its absence of threading or necessity therefor, its complete reliability in service, and the ease with which it may both be inserted and removed, it being substantially leakproof in operation while readily venting gases which are evolved.

Other objects and advantages of our invention will in part be obvious and in part more fully pointed out hereinafter having reference to the following description when construed in the light of the disclosure of the accompanying drawings.

Accordingly, our invention may properly be considered to reside in the various and related components and parts, in the several elements and features of construction and in materials employed, and in both the relation and combination of each of the same to and with one or more of the others, the scope of the application of all of which is more fully set forth in the claims at the end of this disclosure.

Figure 8:
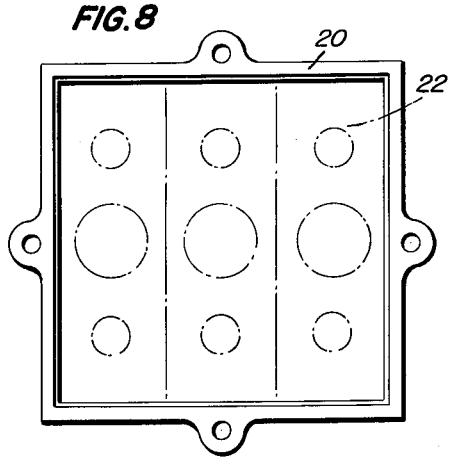
Figure 9:
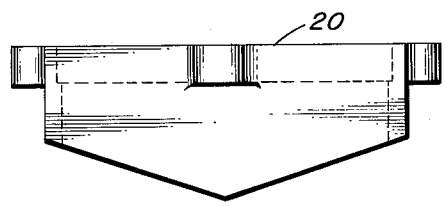
Figure 10:
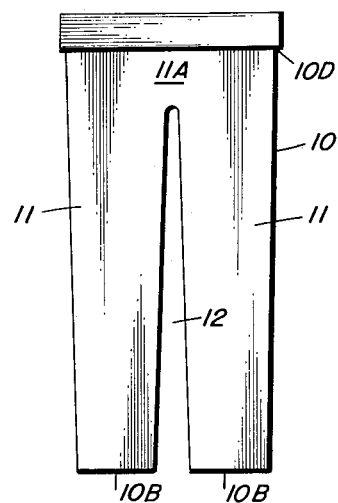
Figure 11:
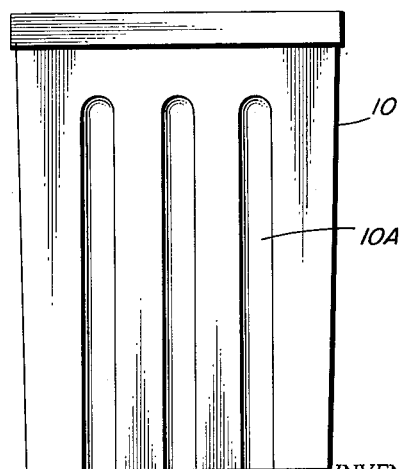
Figure 12:
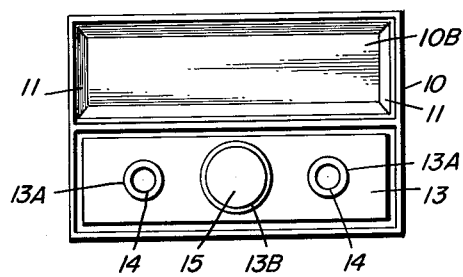
Figure 13:
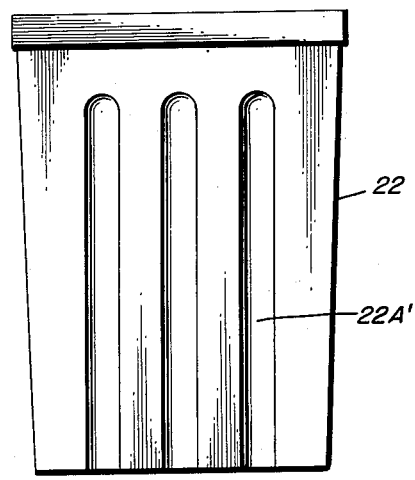
Figure 14:
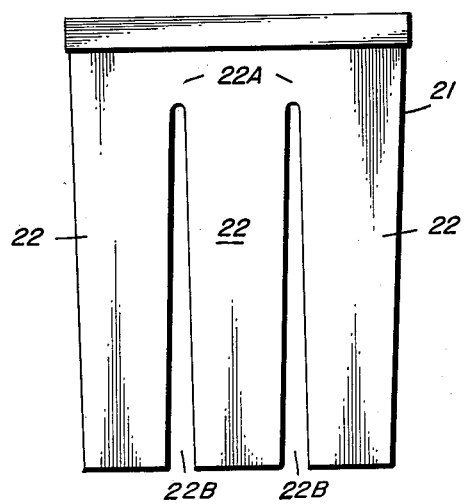
Figure 15:
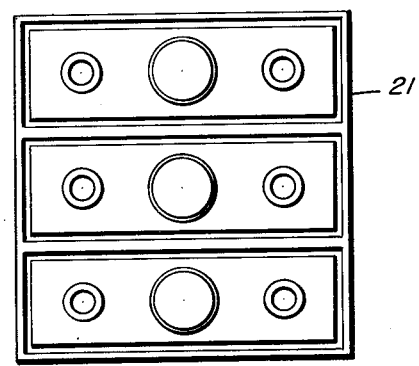
Figure 16:
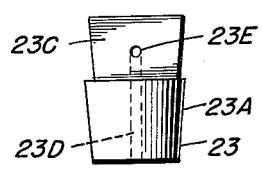
Figure 17:
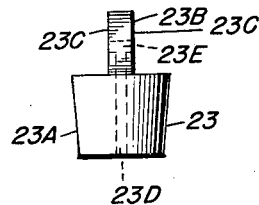
Figure 18:
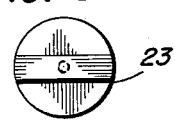

In the several views of the drawings, wherein we have disclosed several applications of our invention which we prefer at present:

Figs. 1 and 2 disclose in top plan and in side elevation, respectively, one of the frames which we employ in our composite battery as particularly adapted to battery cases of 2-cell design, the resulting battery either of 8-volt rating or 4-volt rating at double current capacity;

Figs. 3 and 4 disclose a battery frame for a battery of 8-volt rating of so-called "square" construction, wherein the 2-cell battery casings are disposed side by side, as distinguished from their abutting relationship in Figs. 1 and 2;

Figs. 5 and 6 disclose a rectangular battery which may be either of the 6-volt or 12-volt type and wherein the elongated frame is combined with three 2-cell battery casings disposed in abutting relation and with this embodiment, where desired, the two cells of each casing may be connected in parallel, thus providing a battery of 6-volt rating and of double capacity;

Fig. 7 discloses, in top plan, a frame generally similar to that of Figs. 1 and 2, but particularly adapted to a battery of 12-volt rating and employing 3-cell casings, and wherein the battery compartments are disposed end to end thus providing an elongated or rectangular battery;

Figs. 8 and 9 disclose, in top plan and in side elevation, respectively, a battery frame for a 6-volt battery of so-called "square" construction, employing only a single battery casing of the 3-cell type;

Figs. 10, 11 and 12, respectively, disclose in end and front elevations and in top plan view a 2-cell battery casing according to our invention;

Figs. 13, 14 and 15 disclose generally similar front and end elevations and top plan view, respectively of a 3-cell battery casing, while Figs. 16, 17 and 18, respectively, disclose front, side and top views of our new twist-type battery cap.

Throughout the several views of the drawings like reference characters denote like structural parts.

To facilitate more thorough understanding of our invention it may here be noted that with ever-increasing demand for electric storage batteries displaying high level minimal characteristics of service under severe operating conditions, varying between wide extremes, the highly competitive nature of this active field imposes drastic penalties on manufacturing inefficiencies. By like token important premiums attend seemingly minor refinements in production. Particularly is this true when measured in light of the fact that in addition to the comparatively small number of large battery manufacturers, which are collectively dominant in the field, there are hundreds of smaller and more marginal producers.

With the foregoing in mind it should now be recalled that these batteries ordinarily are made available to the public in some eight or more different sizes and ratings. To illustrate, we may list first the conventional and well known 6-volt batteries of both square and rectangular configurations; secondly, two 6-volt batteries of double capacity disposed side by side, and again of either square or rectangular configuration; a 12-volt battery of either rectangular or square configuration; an 8-volt battery of either square or rectangular configuration, as well as other of generally like type.

And it is further to be recalled that such storage battery in its simplest aspect comprises firstly a container, i.e., a casing, usually formed of hard rubber or bituminous product. This casing is provided with either three, four or six compartments, depending upon the battery voltage which is desired (6, 8 or 12-volts, respectively).

An electrolyte, usually sulphuric acid, is carried in each compartment; and as well, a stack of negative and positive plates are disposed therein along with separators disposed between adjacent plates. Lids are provided for each such compartment; and conductive straps are provided, for connecting the cells together. The necessity for producing and stockpiling these batteries of some eight or more different sizes and ratings falls with especial severity on the small manufacturer.

An object of our invention, therefore, is to provide a storage battery characterized by its basic simplicity, its effective use of the combination of a small number of battery cases and mounting frames therefor, each being separately and readily fabricated and stockpiled, preferably in telescopic relation as to the others of the same class, and from which stockpiled components all eight or more accepted and different types of batteries can readily be built up as required for placement in service; and which battery, thus produced, is rugged in character, displays long useful life with faithful service under wide extremes of operating conditions and which, lending itself to markedly effective airwashing in service, continuously evidencing a high degree of eye appeal and eye acceptance to the art, while reducing to a minimum the requisite investment of the manufacturer not only in plant and labor but, as well, in warehousing and stockpiling.

Referring now to the practice of our invention, we make up a battery comprising a combination of separable cases and mounting frames for these cases. As to the battery case, itself, we find that only two such cases, one of 2-cell construction, the other of 3-cell construction, are necessary. We disclose the 2-cell construction in Figs. 10, 11 and 12. The 3-cell casing forms the basis of the disclosure of Figs. 13, 14 and 15.

And for the eight or more basic type of batteries, we find that we need provide only five shapes and sizes of the comparatively shallow frame. The geometry of these different frames is surprisingly similar to each other (compare the disclosures of Figs. 2, 4, 6 and 9). And these frames are readily stacked in parallel and overlapping piles, thus effectively minimizing requisite storage space and facilitating transport at low transport cost.

Having reference at this point, for illustration, to a battery casing of 2-cell rating, such as is disclosed in Figs. 10, 11 and 12, it will be seen that we provide a casing which is indicated generally at 10 in Figs. 10 and 11. This casing is divided into two like compartments 11, 11. These two compartments are in large measure separate from each other both structurally and functionally, being joined together only in their upper regions, as at 11A. Preferably we form the battery casing 10 of a suitable plastic. We find plastic to be more reliable than either the hard rubber or bituminous materials heretofore in widespread use; it is much lighter and lends itself materially to importantly lowering cost of transport. Polystyrene is effectively used as the plastic for our battery casing. Polyethylene also is used with advantageous results where desired. High dielectric value attends the use of either such plastic. Tendency to crack is minimized. Detrimental thermal stressing is in large measure avoided, the casing equally withstanding high temperature summer usage and cold weather use, as well, without cracking, spilling and the like. Moreover, as noted above, overall weight is materially reduced.

To add appreciably to the desirable operating characteristics of our new battery, and to permit low temperature operation thereof, we space the compartments 11, 11 of the casing 10 apart from each other throughout the greater part of their transverse extent and completely across their longitudinal extent. Orienting the foregoing with respect to Figs. 10 and 11, it will be seen that the air channel 12, as viewed vertically, extends with converging taper from the bottom of the compartment 11, 11 to the junction of these two compartments near the tops thereof. And as well, this channel 12, as viewed horizontally, extends entirely across the casing 10 (as shown in Fig. 11) from one vertical side wall of the casing 10 to the other. The effect of this construction, from the standpoint of temperature control, is to divide the casing 10 into two separate compartments, each for a separate 2-volt cell, each of which compartment is thoroughly air-washed to keep the 2-cell battery cool in operation. In short, compartment 11 is completely air-washed or air-cooled on all four vertical surfaces, that is, the two sides and the two ends.

As a further feature of our invention, it is to be noted that as a result of the tapered walls, see Figs. 10, 11 and 12, each casing 10 may be telescoped within another such casing, either for transport or for storage until at such time that battery assembly is desired. Thus not only is warehouse space reduced to a minimum, but shipping costs are reduced as well.

Having attention to the front wall of the casing 10 as disclosed at Fig. 11 it will be seen that in a preferred embodiment we provide a plurality—here three in number—of depressions or channelized grooves 10A which extend from near the bottom 10B of the casing up to but short of the top of the same. These depressions, typically having a depth of about $\frac{1}{16}$ of an inch, not only add eye appeal to the casing but serve to strengthen the casing walls and yet diminish the quantity of material employed and thereby lower the cost of production. Moreover, the contribution to ready air-washing of the casing. Since these depressions are produced in the process of molding the casing their inclusion involves no additional cost.

In assembling the battery, we provide a stack of negative and positive plates in each casing compartment with separators between related negative and positive plates. We thereupon add sulphuric acid or other electrolyte and apply a lid to the top of the casing. Such top is indicated generally at 13 in Fig. 12, as applied to one cell of the 2-cell unit undergoing discussion. Of course it is contemplated that a like top and like plate be used with the other compartment shown in Fig. 12. The top itself is generally similar to that disclosed in our somewhat related and companion application, Ser. No. 685,225 filed September 20, 1957 and entitled Electric Storage Battery and Case. The details of construction of this top, however, do not in themselves form part of our invention and are therefore omitted for simplicity.

Through the opposed openings 13A, 13A of the top 13 extend the terminals 14, 14 of the related cell, while through the central opening 13B extends the filler cap 15. This cap will be discussed later, having particular reference to the disclosure of Figs. 16, 17 and 18.

As suggested hereinbefore, the 2-cell casings 10 are stockpiled, preferably and typically in telescoped relationship to each other, until it is desired to assemble the battery for service. As such time a plurality of these casings are assembled, through the insertion of plates, application and sealing of related tops 13, and introduction of electrolyte.

As will be evident from a consideration of Figs. 1, 3 and 5, when the time comes to assemble the battery, we may relate the 2-cell casing 10 to any one of three different types of carrying frames. The frame indicated generally at 16 in Figs. 1 and 2 will provide an 8-volt battery of elongated or rectangular type, the frame 17 of Figs. 3 and 4 will provide the so-called "square" battery of 8-volt rating of double capacity while the frame 18 of Figs. 5 and 6 will provide a rectangular battery of either 12-volt rating or a 6-volt rating at double capacity.

To make up the rectangular battery of 8-volt rating according to Figs. 1 and 2, we provide two 2-cell battery casings 10 in abutting relationship, each such casing having the two cells connected in series to give 4 volts; the two casings are also connected in series, placing all four cells in series, to give an 8-volt battery. Where a 4-volt battery of double current output is desired the two casings are connected in parallel.

The holding frame 16 is preferably, although not necessarily, formed of plastic. Elongated of construction, it has four bosses 16A disposed one centrally of each side thereof, projecting outwardly therefrom, and being centrally bored as at 16B for the reception of related lockdown bolts, not shown. It is not necessary that the frame completely surround all surfaces of the related battery casings 10; in fact, for effective circulation of air, the frame encompasses the casing to minimum extent. Accordingly, frame 16 is of but comparatively shallow depth 16B at its transverse ends 16C, increasing in depth along tapered or inclined side walls 16D to a point 16E of greatest depth at the transverse center of the frame. A vertical supporting web 16F extends transversely and centrally across the frame 16, interconnecting and reinforcing the longitudinal walls 16D, 16D thereof. These transverse and longitudinal walls are internally recessed as at 16G, to provide a shoulder upon and against which rests the cells or casings 10, 10. As perhaps best shown in Figs. 10 and 11, the casings are provided with enlarged and outwardly offset head portions 10C which provide undercut shoulders 10D, which cooperate with the recesses 16G of the frame 16. Thus the cells are stably mounted in and are suspended from the frame 16. In turn, this frame is firmly bolted in position in the related automobile or similar unit of application.

In Figs. 3 and 4 we also disclose an 8-volt battery which, however, is the so-called square type. For this battery we employ a frame 17 which likewise is easily stockpiled. It will be noted that frame 17, viewed in plan, has end walls 17C and side walls 17D which more closely approximate each other in length than is true of the walls 16C and 16D of the rectangular construction according to Figs. 1 and 2. We provide hold-down bosses 17A, similar to the bosses 16A of the rectangular construction. These bosses are similarly pierced at 17B to facilitate locking the frame down on the equipment with which it is to be associated. A divider strip 17F extends centrally between the longitudinal side walls 17D, 17D midway along the length thereof, separating the frame into two casing-receiving regions. In this construction the related 2-cell battery casings 10 are placed side by side, being mounted within the frame 17 in the complemental battery-receiving regions 17E, 17E of these casings, the separate compartments of these cells extending downwardly through and beyond the frame 17 into the atmosphere, for ready air-washing.

The frame 17, just as is true of the frame 16 as shown in Figs. 1 and 2, can be readily stacked in somewhat diamond-like echelon relationship, thereby employing a minimum space both for dead storage and for transit. The limited depth of the frame not only is consistent with adequate strength but minimizes both quantity of the frame material required and the weight thereof, while facilitating cooling the battery while in service through adequate washing with air.

Finally, and still having reference to the 2-cell battery casing according to the practice of our invention, it will be seen that with the construction of Figs. 5 and 6 the frame 18 has elongated side walls 18D, 18D, the end walls 18C, 18C having the same dimensions as do the end walls 16C of the construction shown in Figs. 1 and 2. Two symmetrically spaced divider strips 18F, 18F are provided, which separate the frame 18 into three regions for receiving the relating casings 10. These casings are mounted, one in each of the three regions defined by the separators 18F, 18F by appropriate connections, as by connector or jumper straps (not shown, for clarity) between the cell terminals of the adjacent casings. As may readily be seen, the resulting battery may be either of 12-volt rating or 6-volt rating of double current capacity. It will be seen from the foregoing, having reference to the 2-cell type of battery casing, that only three types of frames need be provided to suit all types of 6-, 8- or 12-volt batteries which employ the 2-cell casing.

Now directing attention to batteries of other shapes and sizes, in Fig. 7 we disclose a frame 19 in which two 3-cell casings 21 are provided, disposed side by side. And in Fig. 8 we disclose a frame 20 carrying one such 3-cell casing.

But first having particular reference to Figs. 13, 14 and 15, it will be in order now to describe the 3-cell type of casing as disclosed therein. This casing, generally indicated 21, is closely similar to the 2-cell casing as disclosed in Figs. 10, 11 and 12. In essence, it is comprised of three like compartments 22, 22, 22, all joined together in the region of their tops at 22A. As best disclosed in Fig. 14, each two adjoining compartments 22 are separated from each other by an air channel 23 which, in manner similar to air channel 12 of the embodiment according to Fig. 10, extends nearly the full length of these compartments, and permits these latter to be washed by air almost completely along the sides and ends thereof. Channelized depressions 22A are molded in the front and rear faces of the casings, having depth of about 1/16 of an inch, in manner conforming to the depressions 10A of the 2-cell casings shown in Fig. 11. These depressions add to the strength of the casing, reduce the amount of material required, and facilitate air cooling through increasing the exposed surface area of the cell compartment.

A stack of plates, positive and negative, adjacent plates being divided by separators, is placed in each cell compartment 23. A top is then placed in position over each cell, similar to the tops shown in Fig. 14. These tops are set in position in conventional manner and sealed, the mode of application and sealing not in themselves forming part of this invention. Upon adding electrolyte through the central opening 13B of the battery top 13, comprising a filler neck, the battery is ready for charging.

Storage of the casings 21 prior to making up batteries, is facilitated by telescoping one casing atop the other, this because of the taper to the walls of the compartments or legs 22, 22, 22. Substantial savings are thus achieved, both in storage and transit requirements.

To provide a battery according to Fig. 7 we mount two 3-cell battery casings or units 21 within the frame 19. And we connect these cells together either in series or in parallel to provide either a 12-volt battery or a 6-volt battery of double capacity. This battery is an adaptation of the so-called square type of battery, wherein the battery casings 22, 22, 22 are disposed in side by side relation.

From the foregoing it will be seen that for the 3-cell casings, frames of two sizes are stockpiled. And it is further evident that for either storage or stockpiling, these frames may be stacked atop each other in diamond-like echelon, just as with the frames provided for 2-cell casings.

Accordingly, it is further apparent from the foregoing that we have made it possible, through the provision of two types of battery casings, one of 2-cell and one of 3-cell compartments, together with frames of five different sizes, to readily assemble, as and when required, any and all batteries of the some eight or more standard and recognized ratings and configurations. It is but a simple matter and one requiring only limited time, to provide a battery of just the required rating and dimensions. Both the casings and the frames are readily stockpiled. Space and cost both of storage and of transit, are reduced to a minimum.

A final factor contributing to the minimum cost of our new construction is the provision of a battery filler cap which effectively avoids all necessity for threading, and which is readily twisted into locking engagement in the battery filler neck, only to be disengaged, where desired, with equal facility.

As disclosed in Figs. 16, 17 and 18, the filler cap, indicated at 23, has frusto-conical configuration, the shank or body portion thereof tapering downwardly in conformity with the generally complemental shape of the battery filler neck. The taper of the cap is indicated at 23A. And cap 23 terminates at its top in a finger grip position 23B formed by parallel surfaces 23C, 23C. A channel 23D extends from the bottom or inner end of said cap, up through the tapered body 23A thereof and into the hand portion 23B, where it is joined by a similar channel 23E generally disposed at right angle thereto and which lets out to the atmosphere. These channels permit the venting of gas evolved in the battery during operation thereof.

The cap is formed of suitable plastic, preferably either the polystyrene or polyethylene from which the battery casings and frames are formed. Thus the qualities of high dielectric strength, low weight and simplicity of formation are imparted. No necessity exists for the provision of threads in either the cap or the filler neck of the battery casing. The cap may be readily locked into position through a simple twist. And through a similar simple twist the cap may as be readily removed as and when desired, either to check the battery electrolyte, or to add electrolyte, or to drain the battery for dismantling.

It is apparent from the foregoing that our new battery construction permits the small manufacturer, through the production and stockpiling of but two types of battery containers and five sizes and dimensions of holding frames, to meet in ready, simple and direct manner, demands for all recognized types of batteries. Moreover, the construction provides high efficiency of operation coupled with requisite cooling under severe extremes of the conditions of such operation by virtue of the air-wash provision between cells. With temperature kept to a minimum and this during prolonged periods of operation, absorption of electrolyte is minimized and seepage is eliminated, as is the likelihood of breakage. Frothing is avoided, together with its resulting loss of electrolyte and damage to the surrounding equipment.

Assembly and sealing of the battery can be deferred until there is a demand for a battery of particular type. The battery cases are mounted in the related frame and it is a manner of just everyday practice to apply the cells tops, to seal them and to then apply the connecting straps. No new technique is involved in making up the batteries. Strong appeal thus exists to the small manufacturer, since the mode of building our new composite battery is just a matter of performing the same assembly procedure which he has been following for years.

The unthreaded twist cap of our invention lends to the simplicity and low cost of our battery in that it may be cheaply produced. The cap is in the nature of a plastic stopper which may be directly twisted into either closed or opened position.

We provide a battery displaying high dielectric qualities, low weight and an ease of assembly. All of the foregoing is achieved without sacrifice of the effective eye appeal which we impart to the battery. These several features detailed in the foregoing, together with many other highly practical advantages, attend the practice of our invention.

It is apparent that once the broad aspects of our invention are disclosed both many embodiments thereof and many modifications of the disclosed embodiments will readily suggest themselves to those skilled in the art. Accordingly, we intend the foregoing disclosure to be considered as purely illustrative and not as a limitation.

We claim as our invention:

1. A composite storage battery built up of the combination of at least one battery casing; and an open rectangular carrying frame therefor nicely receiving said casing, the casing being formed of polystyrene, and being selected for 2-cell or 3-cell construction wherein individual cell compartments for each such construction are employed, which are integrally formed at the top portion thereof and for the greater part of their extent are physically separated from each other to provide air-washing between compartments and about all major surfaces thereof and the carrying frame having geometry conforming closely to the particular type of battery desired.

2. A built up storage battery provided in a selected one of a variety of standardized ratings and dimensions and comprised of at least one battery casing; and an open rectangular carrying frame nicely receiving and supporting said casing, the casing being selected from 2-cell and 3-cell construction with each cell of each said casing being comprised as a separate compartment integrally joined together only adjacent the top portions thereof, a slightly converging taper being imparted to each such compartment away from the region of junction with other such compartments, thereby facilitating both physical stacking in storage and cooling by air-washing in service, and the frame having geometry conforming to the particular type of battery desired.

3. A composite storage battery of a selected one of a variety of standardized ratings and dimensions and comprising in combination at least one battery casing; and an open rectangular carrying frame therefor, said casing being selected from 2-cell and 3-cell construction in which casing there are provided individual compartments for the respective cells, the said compartments being integrally formed together at their top portions and, for the greater part of their extents, are physically separated from each other to provide airwash between cell compartments, with the upper portion of said casing having an enlarged and outwardly projecting offset portion, and the open rectangular frame having geometry conforming to the particular type of battery desired and encompassing the battery casing in the region about the upper part thereof and being internally recessed to provide a carrying ledge for nicely seating said offset portion of said casing, the said casing being suspended from said ledge within said frame.

4. A composite storage battery built up to respond to a selected one of a variety of standardized ratings and dimensions of batteries and which said composite battery comprises in combination at least one battery casing; and an open rectangular carrying frame therefor, said casing being selected from 2-cell and 3-cell construction in which casing there are provided individual compartments for the respective cells, the said compartments being integrally formed together at their top portions and, for the greater part of their extents, physically separated from each other to provide air-wash between cell compartments, and said frame being selected from a group of frames having dimensions and configurations for any one of two 2-cell compartments, placed end-to-end; two 2-cell compartments, placed side-by-side; three 2-cell compartments, placed end-to-end; three 2-cell compartments, placed side-by-side; two 3-cell compartments disposed side-by-side or two 3-cell compartments placed end-to-end; each of the possible cell arrangements having the cells thereof electrically connected together either in series or in parallel, thereby providing either selected voltage at given capacity, or halved voltage at doubled capacity.

5. In the production of storage batteries of standard rating and geometry, a set of plural cell battery casings with individual compartments for each cell and the compartments of each casing being integrally joined together in the region of their tops and being physically separate from each other throughout the remainder of their extent for ready air-washing therebetween, the casings of each set being tapered to permit stockpiling in telescopic manner, one atop and partially inside another set.

References Cited in the file of this patent

UNITED STATES PATENTS

| | | |
|---|---|---|
| 1,304,588 | Monahan | May 27, 1919 |
| 1,364,358 | Edison | Jan. 4, 1921 |
| 1,367,593 | Ford | Feb. 8, 1921 |
| 1,367,594 | Ford | Feb. 8, 1921 |

FOREIGN PATENTS

| | | |
|---|---|---|
| 286,863 | Great Britain | Mar. 15, 1926 |
| 293,945 | Great Britain | July 19, 1928 |